United States Patent Office 3,332,917
Patented July 25, 1967

3,332,917
REDUCING COLD FLOW IN DIENE POLYMERS BY SHORTSTOPPING THE POLYMERIZATION WITH MONO- AND POLYISOTHIOCYANATES
Henry L. Hsieh, Bartlesville, Okla., assignor to Phillips Petroleum Company, a corporation of Delaware
No Drawing. Filed July 17, 1963, Ser. No. 295,842
13 Claims. (Cl. 260—83.7)

This invention relates to a method for preparing homopolymers and copolymers of certain selected conjugated dienes and other unsaturated compounds. In another aspect it relates to a method of reducing the tendency of diene polymers to cold flow by the utilization of certain catalyst inactivating agents, and subsequent processing of the recovered polymer.

There has been conducted in recent years a great deal of research work directed toward the production of improved rubbery polymers. Great advances have been recently made in this field as a result of the discovery of new catalyst systems. These catalyst systems are often described as being "stereospecific" since they are capable of polymerizing monomers, particularly conjugated dienes, to a polymer having a certain geometric configuration. However, there are certain problems in processing, particularly in the packaging, shipping and storing of certain of these polymers. Butadiene-styrene random copolymers, for example, present a certain amount of difficulty because of the tendency of the polymers to cold flow when in the unvulcanized state. For example, if cracks or punctures develop in the package used in storing the unvulcanized polymer, it will flow from the package with a resulting product loss or contamination and sticking together of stacked packages. Bales of the polymer product with high cold flow also tend to lose their shape. In order to prevent problems from arising due to cold flow, resort often has been made to special packaging of the polymer at considerable cost. While this property of cold flow generally does not detract from the desirable properties of the vulcanizates, it is desirable to eliminate the cold flow tendence as a convenience in storage, transportation, and the like.

It is an object of this invention, therefore, to provide a method for terminating the polymerization reaction in which polybutadiene is produced so as to obtain a polymer product which has a reduced tendency to cold flow.

Another object of the invention is to provide a novel composition containing polybutadiene which has a reduced tendency to cold flow when in the unvulcanized state.

A further object of the invention is to provide a method for inactivating an organolithium catalyst which is employed in the polymerization of 1,3-butadiene.

A still further object is to provide a process for preparing copolymers of conjugated dienes in the presence of organolithium initiatiors so as to obtain polymer products which have a reduced tendency to cold flow.

When polymerizing conjugated dienes such as butadiene, isoprene, and the like, alone or in admixture with each other, or with other copolymerizable compounds such as styrene, the reaction is usually terminated or short-stopped when the conversion has reached the desired level by the addition to the polymerization mixture of an inactivating agent for the initiator. Compounds which have been used in this capacity include water, alcohols, and rosin acids. While these materials are effective shortstopping agents, the products often have a tendency to cold flow when in the unvulcanized state. Accordingly, it was completely unexpected when it was found that mono- and polyisocyanates and mono- and polyisothiocyanates, in addition to being effective shortstopping agents, functioned to reduce the tendency of the polymers to cold flow, particularly if the recovered products were aged at an elevated temperature. While some reduction in cold flow results through the use of the isocyanate and isothiocyanate shortstopping agents, the aging step is considered an important part of the present process.

Briefly stated, the present invention provides a novel composition, either homopolymer or copolymer, of a conjugated diene which has a reduced tendency to cold flow when in the unvulcanized state. A process for preparing said novel composition is provided by polymerizing a conjugated diene such as 1,3-butadiene in the presence of an organolithium compound, shortstopping the reaction by addition of a compound selected from the group consisting of mono- and polyisocyanates and mono- and polyisothiocyanates, and aging the recovered polymer at a temperature in the range of from 100 to 350° F. for an aging period from 5 minutes to ten weeks. When aging in the preferred range of 150 to 250° F., aging periods of 30 minutes to 20 hours generally give satisfactory results.

In general, the process comprises polymerizing at least one conjugated diene ordinarily containing from 4 to 12 carbon atoms per molecule, and those containing from 4 to 8 carbon atoms are preferred. Monomers copolymerizable with conjugated dienes include vinyl-substituted aromatic hydrocarbons, vinyl halides, vinylidene halides, esters of acrylic acid, and esters of homologues of acrylic acid, with an organolithium compound in the presence of a solvent mixture comprising: (1) a hydrocarbon selected from the group consisting of aromatic hydrocarbons, paraffins and cycloparaffins, and (2) a polar organic compound, if a random copolymer of a conjugated diene is to be prepared. Examples of such compounds include: 1,3-butadiene, isoprene, 2,3-dimethyl-1,3-butadiene, piperylene, 3-butyl-1,3-octadiene, phenyl-1,3-butadiene and the like. The vinyl-substituted aromatic compounds include styrene, 1-vinylnaphthalene, 2-vinylnaphthalene and the alkyl, cycloalkyl, aryl, alkaryl, and aralkyl derivatives thereof in which the total number of carbon atoms in the combined substituents is generally not greater than 12. Examples of such substituted monomers include 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl) styrene, and the like. The conjugated dienes and the vinyl-substituted aromatic compounds can be polymerized alone or in admixture to form homopolymers, copolymers or block copolymers. It is preferred that one of the monomeric materials used in the process be one of the conjugated dienes, i.e., 1,3-butadiene, 2-methyl-1,3-butadiene (isoprene) or 1,3-pentadiene (piperylene). It is also preferred that the diene monomer in a weight ratio of 50:50 to 95:5 be utilized in the practice of this invention in order to produce a rubbery copolymer.

Any suitable vinyl-substituted aromatic hydrocarbon can be employed as a comonomer in the process of this invention. However, it is to be understood that compounds containing substituents on the alpha carbon, such as alphamethylstyrene, are not applicable to the instant process. Examples of suitable vinyl-substituted aromatic hydrocarbons include styrene, 3-vinyltoluene, 1-vinylnaphthalene, 2-vinylnaphthalene, 3-methylstyrene, and the like.

As heretofore indicated, vinyl halides and vinylidene halides can be used as comonomers in the practice of this invention. Examples of suitable halides include vinyl chloride, vinyl bromide, vinylidene chloride, and the like. Esters of acrylic acid and esters of homologues of acrylic acid can also be employed in preparing the copolymers of this invention. Examples of such compounds include methyl methacrylate, ethyl acrylate, ethyl ethacrylate, methyl acrylate, ethyl methacrylate, butyl methacrylate, propyl acrylate, n-butyl acrylate, phenyl methacrylate, and the like.

As mentioned hereinbefore, the polymerization can be carried out in the presence of a solvent comprising a hydrocarbon selected from the group consisting of aromatic hydrocarbons, paraffins and cycloparaffins, or mixtures thereof, and optionally a polar compound which does not inactivate the organolithium compound employed as the catalyst. The solvent is one which is liquid under the conditions of the process. Examples of suitable hydrocarbons which can be used include propane, isobutane, n-pentane, isooctane, n-dodecane, cyclopentane, cyclohexane, methylcyclopentane, ethylcyclopentane, dimethylcyclopentane, ethylcyclohexane, benzene, toluene, xylene, ethylbenzene, naphthalene and the like. Mixtures of these various materials can also be employed.

Examples of polar compounds which do not inactivate the organolithium catalyst and which may, therefore, be used as ethers, thioethers, (sulfides) and tertiary amines. Specific examples of such polar materials include dimethyl ether, diethyl ether, methylethyl ether, ethyl propyl ether, di-n-propyl ether, di-n-octyl ether, dibenzyl ether, diphenyl ether, anisole, tetramethylene oxide (tetrahydrofuran), 1,2-dimethoxyethane, dioxane, paraldehyde, dimethyl sulfide, diethyl sulfide, di-n-propylsulfide, di-n-butylsulfide, methyl ethyl sulfide, dimethylethylamine, tri-n-propylamine, tri-n-butylamine, trimethylamine, triethylamine, N,N-dimethylaniline, pyridine, quinoline, N-ethylpiperidine, N-methyl-N-ethylaniline, N-methylmorpholine, and the like. It is to be understood also that mixtures of these polar compounds can be employed in the practice of the instant invention.

It has been discovered that the presence of the polar compound as described hereinabove, results in the formation of the random copolymers of this invention, as described in U.S. Patent No. 2,975,160, issued Mar. 14, 1961. If the polar compound is not used, e.g., in the polymerization of butadiene and styrene, a block polymer is formed.

The organolithium compound used as a catalyst in the practice of the process of this invention corresponds to the general formula $R(Li)_x$, wherein R is a hydrocarbon radical selected from the group consisting of aliphatic, cycloaliphatic and aromatic radicals and $x$ is an integer from 1 to 4, inclusive. The R group has a valence equal to the integer $x$ and preferably contains from 1 to 20, inclusive, carbon atoms, although it is within the scope of the invention to use higher molecular weight compounds. Examples of organolithium compounds which can be used include methyllithium, isopropyllithium, n-butyllithium, t-decyllithium, phenyllithium, naphthyllithium, 4-butyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithiobutene-2, 1,8-dilithio-3-decene, 1,4-dilithiobenzene, 1,5-dilithionaphthalene, 1,3-dilithio-1, 2-diphenylethane, 1,5-diilthioanthracene, 1,2-dilithio-1, 8-diphenyloctane, 1,3,5-trilithiopentane, 1,5,15-trilithioeicosane, 1,3,5-trithiocyclohexane, 1,2,5-trilithionaphthalene, 1,3,5-trithioanthracene, 1,3,5,8-tetralithiodecane, 1,5,10,20-tetrathioeicosane, 1,2,4,6-tetralithiocyclohexane, 1,2,3,5-tetrathio-4-hexylanthracene, and the like.

The polymerization process of this invention can be carried out at any temperature within the range of about −80 to 150° C., but it is preferred to operate in the range of −20 to 80° C. The polymerizaton reaction can be carried out under autogenous pressures. It is usually desirable to operate at pressures sufficient to maintain the monomeric material substantially in the liquid phase. The pressure will thus depend upon the particular materials being polymerized, the solvent mixture being employed, and a temperature at which the polymerization is carried out. However, higher pressures can be employed, if desired, these pressures being obtained by some such suitable method as the pressurization of the reactor with a gas which is inert with respect to the polymerization reaction.

The amount of the organolithium compound employed in the polymerization can vary over a rather wide range. In general, the amount should be at least 0.02 part by weight per 100 parts by weight of the monomers to be polymerized. The upper limit for the amount of the organolithium compound to be used depends largely upon the desired inherent viscosity of the copolymer obtained in the polymerization. The inherent viscosity of the polymer product decreases with increasing amounts of the organolithium catalyst. A desirable catalyst level is from 0.1 to 2.0 parts by weight of organolithium per 100 parts by weight of the total monomers charged to the polymerization zone.

The process of this invention can be carried out as a batch process by charging the monomeric materials into a reactor containing the organolithium catalyst and the solvent mixture. The process can also be practiced in a continuous manner by maintaining the above-mentioned concentrations of reactants in the reactor for a suitable residence time. The residence time in a continuous process will, of course, vary within rather wide limits depending upon such variables as reaction temperature, pressure, the amount of catalyst used, and the monomeric materials which are being polymerized. In a continuous process, the residence time generally falls within the range of one second to one hour when conditions within the specified ranges are employed. When a batch process is being utilized, the time for the reaction can be as high as 24 hours or more, although it is generally less than 24 hours.

Various materials are known to be destructive to the organolithium catalyst of this invention. These materials include carbon dioxide, oxygen, water, alcohols, mercaptans, and primary and secondary amines. It is highly desirable, therefore, that the monomers be freed of these materials, as well as other materials which tend to inactivate the catalyst. Any of the known means for removing such contaminants can be used. Also, it is preferred that the solvent mixture used in the process be substantially free of impurities such as water, oxygen and the like. In this connection, it is desirable to remove air and moisture from the reaction vessel in which the polymerization is carried out. Although it is preferred to carry out the polymerization under anhydrous or substantially anhydrous conditions, it is to be understood that some water can be tolerated in the reaction mixture. However, the amount of water which may be tolerated in the mixture is insufficient to completely deactivate the catalyst.

The shortstopping agents of this invention include compounds in which at least one of the groups —N=C=O and —N=C=S is present. The compounds can be conveniently represented by the general formulas $R(NCO)_m$ and $R'(NCS)_n$ wherein R and R' are aliphatic, cycloaliphatic, or aromatic radicals containing from 2 to 30 carbon atoms and $m$ and $n$ are integers from 1 to 4. It is preferred that the R and R' radicals be hydrocarbon in character although the presence of unreactive groups containing elements other than carbon and hydrogen is permissible.

Specific examples of mono- and polyisocyanates and mono- and polyisothiocyanates include:

propane isocyanate,
hexane-2-isocyanate,
decane-1-isocyanate,
cyclohexane isocyanate,
benzene isocyanate,
toluene-2-isocyanate,
toluene-4-isocyanate, naphthalene-2-isocyanate,
benzene-1,3-diisocyanate,
benzene-1,4-diisocyanate,
hexane-1,6-diisocyanate,
toluene-2,4-diisocyanate,
toluene-3,4-diisocyanate,
diphenylmethane-4,4'-diisocyanate,
naphthalene-1,5-diisocyanate,
biphenyl-4,4'-diisocyanate,
biphenyl-3,3'-dimethyl-4,4'-diisocyanate,
biphenyl-3,3'-dimethoxy-4,4'-diisocyanate,
2,2'-diisocyanate diethyl ether,
3-(diethylamino)pentane-1,5-diisocyanate,
pentane-1,5-diisocyanate,
butane-1,4-diisocyanate,
octane-1,8-diisocyanate,
ethane diisocyanate,
propane-1,2-diisocyanate,
cyclohex-4-ene-1,2-diisocyanate,
benzene-1,2,4-triisocyanate,
naphthalene-1,3,5,7-tetraisocyanate,
triphenylmethane triisocyanate,
naphthalene-1,3,7-triisocyanate,
and the corresponding mono- and polyisothiocyanates such as propane isothiocyanate,
hexane-2-isothiocyanate,
hexane-1-6-diisothiocyanate, and
triphenylmethane triisothiocyanate.

A commercially available polyaryl poliisocyanate (PAPI–1*) having an average of three isocyanate groups per molecule and an average weight of about 380 can also be used. The general formula of this compound is as follows:

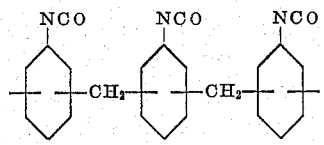

Upon completion of an organolithium-initiated polymerization, the reaction mixture is treated to inactivate the initiator and recover the rubbery polymer. In accordance with the present invention, the initiator is inactivated by adding to the reaction mixture an isocyanate or isothiocyanate as hereinbefore described. The amount of this shortstopping agent employed is usually in the range of 0.5 to 6 equivalents based on the lithium in the initiator, but larger amounts can be used if desired. The preferred amount is from 1 to 3 equivalents per gram atom of lithium in the initiator.

After addition of the shortstopping agent the mixture is generally agitated for a period of time in the range from 5 minutes to 50 hours, depending upon the temperature. While the temperature is conveniently maintained at the level employed in the polymerization, this is not a requirement.

Following treatment with the shortstopping agent, the polymer is recovered by conventional methods such as steam stripping, alcohol coagulation, or the like. The polymer is then aged at an elevated temperature during which time there is a significant reduction in cold flow. Aging conditions are controlled in order to obtain the desired reduction in cold flow without producing gel formation. Too high a temperature can result in gel formation and/or degradation of the polymer. The temperature employed for the aging step is generally in the range from 100 to 350° F., preferably in the range from 150 to 250° F. The aging time will depend upon the temperature and can vary from 5 minutes to several weeks, e.g., 8 or 10 weeks. When operating in the preferred temperature range of 150 to 250° F., aging periods of 30 minutes to 20 hours generally give satisfactory results.

It is, of course, to be realized that it is within the scope of the invention to employ other suitable means to recover the polymer from solution. After separation from the solvent mixture and alcohol by filtration or other suitable means, the polymer is dried. The polymer can also be redissolved in a suitable diluent and again precipitated, as described above, in order to further purify the material. The solvent mixture and alcohol can in all cases be separated, for example, by fractional distillation, and reused in the process. As hereinbefore mentioned, it is within the scope of the invention to utilize an antioxidant in the process to prevent oxidation of the polymer. The antioxidant can be added to the reaction mixture prior to precipitation of the polymer, to the solution of redissolved polymer, or to the solvent in which the polymer is to be subsequently redissolved.

The copolymers produced in accordance with this invention are rubbery polymers. The term "rubbery polymer" includes elastomeric, vulcanizable polymeric material which after vulcanization, i.e., crosslinking, possesses the properties normally associated with vulcanized rubber, including materials which when compounded and cured exhibit reversible extensibility at 80° F. of over 100 percent of a specimen's original length with a retraction of at least 90 percent within one minute after release of the stress necessary to elongate to 100 percent. The rubbery copolymers can be compounded by any of the known methods such as have been used in the past for compounding natural rubber. Vulcanization accelerators, reinforcing agents, and fillers such as have been employed in natural rubber can likewise be used in compounding the copolymers of this invention.

The cold flow values are determined by extruding the rubber through a ¼ inch orifice at 3.5 p.s.i. pressure and a temperature of 50° C. (122° F.). After allowing 10 minutes to reach steady state, the rate of extrusion was measured and the values reported in milligrams per minute (mg./min.).

A more comprehensive understanding of the invention can be obtained by referring to the following illustrative examples which are not intended, however, to be unduly limitative of the invention.

EXAMPLE I

A polymerization initiator was prepared by reacting lithium with methylnaphthalene and isoprene in the presence of diethyl ether, and solubilizing the reaction product with butadiene. The solubilized product was employed in the following recipe for the polymerization of butadiene:

| | |
|---|---|
| 1,3-butadiene, parts by weight | 100 |
| Cyclohexane, parts by weight | 1000 |
| Initiator, mhm [1] | 1.3 |
| Temperature, ° F. | 122 |
| Time, hours | 3 |
| Benzene isothiocyanate, parts by weight (14.8 moles) | 2 |
| Temperature, ° F. | 122 |
| Time, hours | 1 |

[1] Millimoles per 100 grams monomer.

One method that can be employed for preparing the initiator is to react 0.31 gram atom of lithium wire, 0.1 mole of methylnaphthalene, and 0.1 mole of isoprene in the presence of diethyl ether at −15° F. The product, obtained in the form of a slurry, is solubilized by treatment with 6 moles of butadiene, generally added in several increments.

In the polymerization, cyclohexane was charged first after which the reactor was purged with nitrogen. Butadiene was then added followed by the initiator. After a 3-hour reaction period, 14.8 millimoles (5.7 equivalents based on lithium in the initiator) of benzene isothiocyanate was added in cyclohexane solution. The mixture was agitated for one hour during which time the temperature was maintained at 122° F. After being shortstopped in this manner, the polymer was coagulated with isopropyl alcohol, separated, 0.5 part by weight per 100 parts rubber of the antioxidant, 2,2'-methylene-bis(4-methyl-6-tert-butylphenol) was added, and the product was dried.

The Mooney value (ML–4 at 212° F.), inherent viscosity, gel, and cold flow were determined on the dry polymer. A sample of the polymer was wrapped in polyethylene film and then heated for 24 hours at 212° F. and these properties again determined. The data are presented in Table I:

TABLE I

| Specimen | A Shortstopped | B Aged |
|---|---|---|
| ML–4 at 212° F. | 50 | 82 |
| Inherent viscosity (1) | 2.36 | 2.97 |
| Gel, percent (2) | 0 | 0 |
| Cold flow, mg./min | 18 | 0 |

¹ One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.
² Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, 2-ounce bottle. A piece of folded quarter-inch hardware cloth in the bottom of the bottle supported the cage with minimum contact. The bottle containing the cage was weighed to the nearest 0.02 gram during a minimum 3-minute draining period after which the cage was withdrawn and the bottle again weighed to the nearest 0.02 gram. The difference in the two weighings is the weight of the cage plus the toluene retained by it, and by subtracting the weight of the empty cage from this value the weight of toluene retention is found, i.e., the cage calibration. In the gel determination, after the cage containing the sample had stood for 24 hours in toluene, the cage was withdrawn from the bottle with the aid of forceps and placed in the 2-ounce bottle. The same procedure was followed for determining the weight of swelled gel as was used for calibration of the cage. The weight of swelled gel was corrected by subtracting the cage calibration.

The above data show that the cold flow of polybutadiene was reduced by aging the benzene isothiocyanate-shortstopped polymer at an elevated temperature.

EXAMPLE II

Data have been obtained to demonstrate the effect of aging on the cold flow of a random butadiene/styrene copolymer, shortstopped and coagulated, both with isopropyl alcohol. Two runs were made. The following recipes were used:

| Specimen | C | D |
|---|---|---|
| 1,3-butadiene, parts by weight | 75 | 75 |
| Styrene, parts by weight | 25 | 25 |
| Cyclohexane, parts by weight | 1,000 | 1,000 |
| Tetrahydrofuran, parts by weight | 1.5 | 1.5 |
| Butyllithium, mhm | 1.0 | 1.2 |
| Temperature, °F | 122 | 122 |
| Time, hours | 6 | 6 |
| Conversion, percent | 100 | 100 |

The polymerizations were shortstopped with a solution of the antioxidants, 2,2'-methylene-bis(4-methyl-6-tert-butylphenol) in a 50/50 volume mixture of isopropyl alcohol and toluene, using an amount sufficient to provide 0.5 part by weight of the antioxidant per 100 parts by weight polymer. The polymers were then coagulated in isopropyl alcohol, separated, and dried. Mooney value (ML–4 at 212° F.) and cold flow were determined on the original polymers. A sample of each product was heated at 212° F. for 36 hours, using the procedure described in Example I and cold flow again determined. Results are given below in Table II:

TABLE II

| Specimen | C | D |
|---|---|---|
| Original properties: | | |
| ML–4 at 212° F. | 35 | 22 |
| Cold flow, mg/min | 8.9 | 14.2 |
| Aged 36 hours at 212° F.: Cold flow, mg/min | 6.5 | 11.8 |

While aging alone effected some reduction in cold flow, the difference was of little significance.

EXAMPLE III

A butadiene/styrene random copolymer was prepared in the presence of the lithium-methylnaphthalene-isoprene initiator prepared as described in Example I. The following polymerization recipe was used including one of the shortstopping agents of this invention:

| | |
|---|---|
| 1,3-butadiene, parts by weight | 75 |
| Styrene, parts by weight | 25 |
| Cyclohexane, parts by weight | 1000 |
| Tetrahydrofuran, parts by weight | 1.5 |
| Initiator, mhm | 1.6 |
| Temperature, °F. | 122 |
| Time, hours | 2 |
| Benzene isothiocyanate, parts by weight (4.6 equivalents ¹) | 2 |
| Temperature, °F. | 122 |
| Time, hours | 1 |

¹ Based on lithium in the initiator.

The procedure of Example I was followed. The polymer, after being stabilized with 2,2'-methylene-bis(4-methyl-6-tert-butylphenol) was dried, and Mooney value, inherent viscosity, gel, and cold flow were determined. Samples were aged, at different temperatures and for variable periods, and the same properties again determined. The data are presented in Table III.

TABLE III

| Specimen | E Shortstopped | F Aged at 212° F., 24 Hours | G Aged at 122° F. 4 Weeks | H Aged at 122° F. 8 Weeks |
|---|---|---|---|---|
| ML–4 at 212° F. | 34 | 40 | 47 | 82 |
| Inherent viscosity | 1.66 | 1.75 | 1.78 | 2.50 |
| Gel, percent | 0 | 0 | 0 | 0 |
| Cold flow, mg./min | 8.3 | 3.4 | 2.6 | 0 |

In order to further demonstrate the advantages of the present invention, a series of runs was made in which butadiene/styrene random copolymers were prepared in the normal manner in the presence of organolithium initiators, followed by shortstopping and coagulation both with isopropyl alcohol. Cold flow, corresponding to each of the above Mooney values listed in Table III, is given in Table IV below:

TABLE IV

| Specimen | ML–4 at 212° F. | No aging, cold flow, mg./min. |
|---|---|---|
| E₁ | 34 | 9.1 |
| F₁ | 40 | 8.0 |
| G₁ | 47 | 6.8 |
| H₁ | 82 | 3.4 |

These comparative data show that the cold flow of butadiene/styrene random copolymers was markedly reduced by aging at elevated temperatures the benzene isothiocyanate-shortstopped polymer. When the lower aging temperature was used, greater reduction in cold flow was achieved when the aging time was increased.

Reasonable variation and modification are possible within the scope of the foregoing disclosure and appended claims.

I claim:
1. In a process for preparing a homopolymer of a conjugated diene containing 4 to 12 carbon atoms per molecule in the presence of an initiator system comprising an hydrocarbon lithium compound, the improvement which comprises:
 (a) adding to the polymerization mixture a shortstopping agent selected from the group consisting of mono- and polyisothiocyanates, said adding occurring at a temperature in the range of −20 to 80° C.;
 (b) recovering the polymer from the polymerization mixture; and
 (c) aging the recovered polymer by subjecting same to a temperature in the range from 100 to 350° F. for an aging period from 5 minutes to ten weeks.

2. In a process for preparing a copolymer by contacting at least two monomeric materials the first of which is selected from the group consisting of conjugated dienes containing from 4 to 12 carbon atoms per molecule and the other of which is selected from the group consisting of vinyl substituted aromatic hydrocarbons, vinyl halides, vinylidene halides, esters of acrylic acid, and esters of homologues of acrylic acid, in the presence of an initiator system comprising an hydrocarbon lithium compound, the improvement which comprises:
 (a) adding to the polymerization mixture a shortstopping agent selected from the group consisting of mono- and polyisothiocyanates, said adding occurring at a temperature in the range of −20 to 80° C.;
 (b) recovering the polymer from the polymerization mixture; and
 (c) aging the recovered polymer by subjecting same to a temperature in the range from 100 to 350° F. for an aging period from 5 minutes to ten weeks.

3. In a process for preparing a copolymer by contacting at least two monomeric materials the first of which is selected from the group consisting of 1,3-butadiene, isoprene and piperylene, and the second of which is selected from the group consisting of vinyl-substituted aromatic hydrocarbons, vinyl halides, vinylidene halides, esters of acrylic acid, and esters of homologues of acrylic acid, in the presence of an initiator system comprising an organo-lithium compound corresponding to the formula $R(Li)_x$, wherein R is a hydrocarbon radical selected from the group consisting of aliphatic, cycloaliphatic and aromatic radicals, and $x$ is an integer from 1 to 4, inclusive, the improvement which comprises:
 (a) adding to the polymerization mixture a shortstopping agent selected from the group consisting of mono- and polyisothiocyanates, said adding occurring at a temperature in the range of −20 to 80° C.;
 (b) recovering the polymer from the polymerization mixture; and
 (c) aging the recovered polymer by subjecting same to a temperature in the range from 100 to 350° F. for an aging period from 5 minutes to ten weeks.

4. The method of claim 2 in which said compound is benzene isothiocyanate.

5. The method of claim 2 in which said compound is toluene-2,4-diisothiocyanate.

6. The method of claim 2 in which said compound is a polyaryl polyisothiocyanate.

7. A polybutadiene prepared by polymerizing 1,3-butadiene in the presence of an hydrocarbon lithium compound, shortstopping the reaction by addition of a compound selected from the group consisting of mono- and polyisothiocyanates, said addition occurring at a temperature in the range of −20 to 80° C., and aging the recovered polymer at a temperature in the range of from 100 to 350° F. for an aging period from 5 minutes to ten weeks.

8. A rubbery copolymer of 1,3-butadiene and styrene, said polymer being a random polymer, said copolymer prepared by polymerizing the monomers in the presence of an hydrocarbon lithium compound, shortstopping the reaction by the addition of benzene isothiocyanate, said addition occurring at a temperature in the range of −20 to 80° C., and aging the recovered polymer to a temperature in the range of from 150 to 250° F. for an aging period of from 30 minutes to 20 hours.

9. A process for preparing a copolymer which comprises charging to a polymerization zone containing a catalyst of the formula $R(Li)_x$ where $x$ is an integer from 1 to 4, R is a hydrocarbon radical selected from the group consisting of aliphatic, cycloaliphatic, and aromatic radicals, and a hydrocarbon diluent, a conjugated diene of 4 to 5 carbon atoms and simultaneously a vinyl-substituted aromatic hydrocarbon in which said vinyl group is attached to a nuclear carbon atom,
 (a) adding to the polymerization mixture a shortstopping agent selected from the group consisting of mono- and polyisothiocyanates, said adding occurring at a temperature in the range of −20 to 80° C.;
 (b) recovering the polymer from the polymerization mixture; and
 (c) aging the recovered polymer by subjecting same to a temperature in the range from 100 to 350° F. for an aging period of from 5 minutes to ten weeks.

10. A process for preparing a copolymer which comprises charging to a polymerization zone containing a catalyst comprising a mixture of lithiummethylnaphthalene-isoprene and a hydrocarbon diluent, a conjugated diene of 4 to 5 carbon atoms and simultaneously a vinyl-substituted aromatic hydrocarbon in which said vinyl group is attached to a nuclear carbon atom;
 (a) adding to the polymerization mixture a shortstopping agent selected from the group consisting of mono- and polyisothiocyanates, said adding occurring at a temperature in the range of −20 to 80° C.;
 (b) recovering the polymer from the polymerization mixture; and
 (c) aging the recovered polymer by subjecting same to a temperature in the range from 100 to 350° F. for an aging period of from 5 minutes to ten weeks.

11. A process for preparing a copolymer which comprises charging to a polymerization zone containing a catalyst of the formula $R(Li)_x$, where $x$ is an integer from 1 to 4, R is a hydrocarbon radical selected from the group consisting of aliphatic, cycloaliphatic, and aromatic radicals, and a hydrocarbon diluent, a conjugated diene of 4 to 5 carbon atoms and simultaneously a vinyl substituted aromatic hydrocarbon in which said vinyl group is attached to a nuclear atom, comprising:
 (a) adding to the polymerization mixture a shortstopping agent benzene isothiocyanate, said adding occurring at a temperature in the range of −20 to 80° C.;
 (b) recovering the polymer from the polymerization mixture; and
 (c) aging the recovered polymer by subjecting same to a temperature in the range from 100 to 350° F. for an aging period of from 5 minutes to ten weeks.

12. A process for preparing a copolymer which comprises charging to a polymerization zone containing a catalyst of the formula $R(Li)_x$, where $x$ is an integer from 1 to 4, R is a hydrocarbon radical selected from the group consisting of aliphatic, cycloaliphatic, and aromatic radicals and a hydrocarbon diluent, a conjugated diene of 4 to 5 carbon atoms and simultaneously a vinyl-substituted aromatic hydrocarbon in which said vinyl group is attached to a nuclear atom, comprising:
 (a) adding to the polymerization mixture a shortstopping agent selected from the group consisting of mono- and polyisothiocyanates, said adding occurring at a temperature in the range of −20 to 80° C.;
 (b) recovering the polymer from the polymerization mixture; and
 (c) aging the recovered polymer by subjecting same to a temperature in the range from 150 to 250° F. for an aging period of from 30 minutes to 20 hours.

13. A process for preparing a copolymer of which comprises:
(a) charging to a polymerization zone containing an initiator consisting essentially of a mixture of lithium-methylnaphthalene-isoprene, cyclohexane diluent, 1,3-butadiene, and styrene;
(b) adding to the polymerization mixture after a suitable conversion period a shortstopping agent comprising benzene isothiocyanate in an amount of 0.5 to 6 equivalents based on the gram atoms of lithium in the initiator, said adding occurring at a temperature in the range of −20 to 80° C.;
(c) recovering the copolymer from the polymerization mixture;
(d) aging the recovered polymer by subjecting the same to a temperature in the range from 150° to 250° F. for an aging period from 30 minutes to 20 hours.

References Cited

UNITED STATES PATENTS

| | | | |
|---|---|---|---|
| 2,968,647 | 1/1961 | Koenecke et al. | 260—83.7 |
| 3,225,119 | 12/1965 | Baker | 260—94.2 |

JOSEPH L. SCHOFER, *Primary Examiner.*

JAMES A. SEIDLECK, *Examiner.*

H. I. CANTOR, *Assistant Examiner.*